Aug. 12, 1952     A. H. BATES     2,606,671
SUPPORTING RACK
Filed Jan. 20, 1945     2 SHEETS—SHEET 1
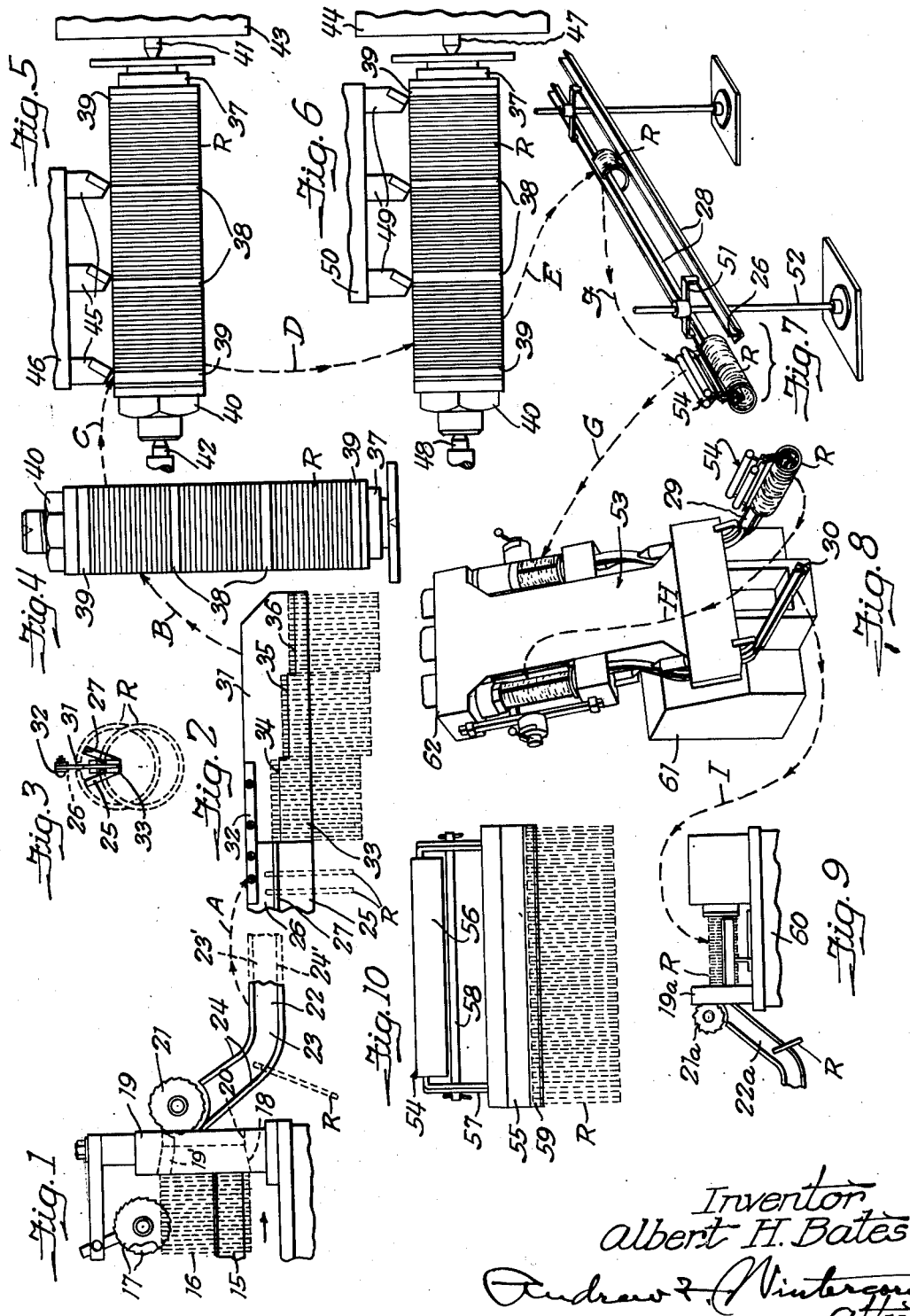
Inventor
Albert H. Bates
Andrew F. Wintercorn
Atty.

Aug. 12, 1952 — A. H. BATES — 2,606,671
SUPPORTING RACK
Filed Jan. 20, 1945 — 2 SHEETS—SHEET 2
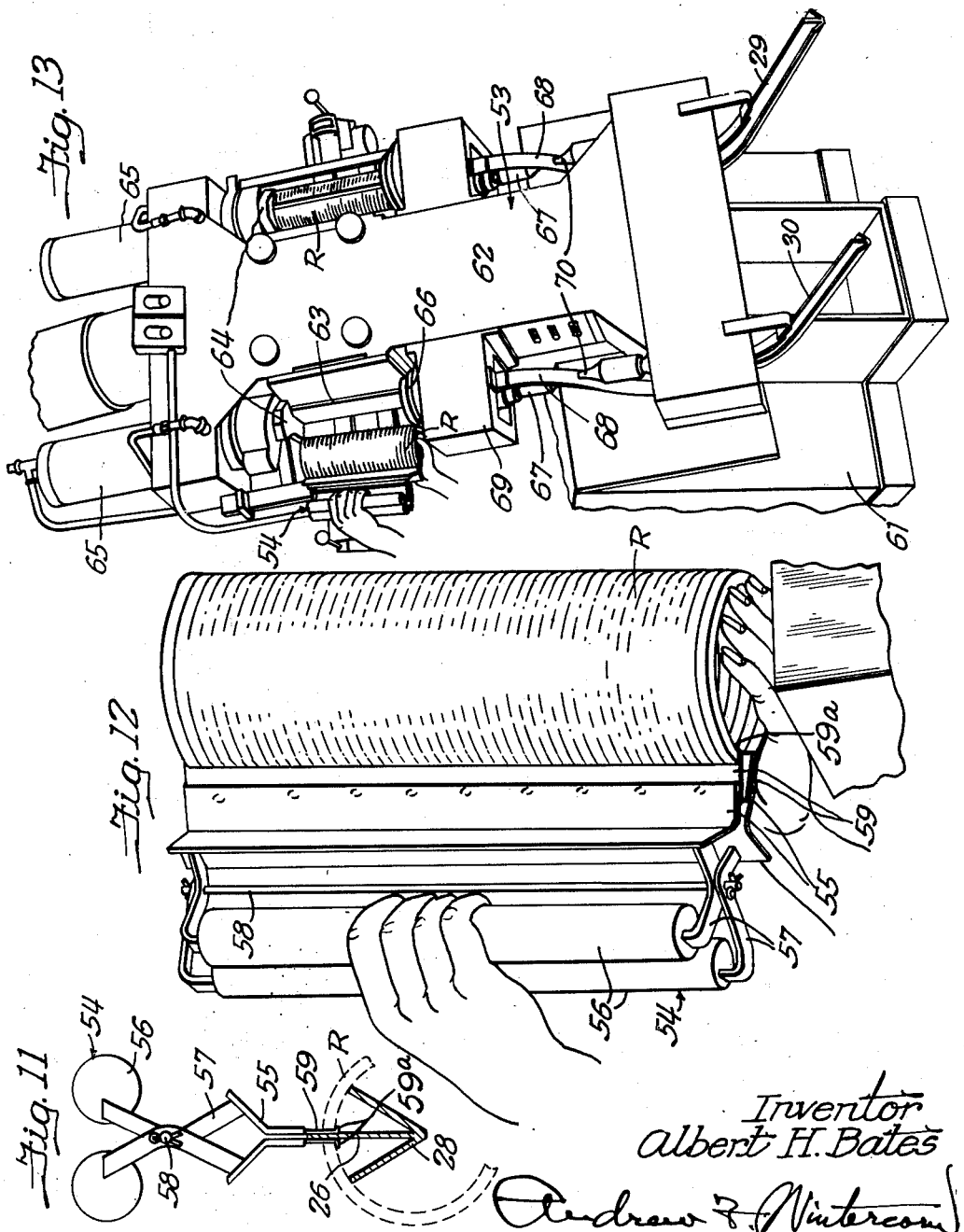
Inventor
Albert H. Bates Patented Aug. 12, 1952

2,606,671

UNITED STATES PATENT OFFICE 2,606,671

SUPPORTING RACK

Albert H. Bates, Rockford, Ill., assignor to Burd Piston Ring Company, Rockford, Ill., a corporation of Illinois Application January 20, 1945, Serial No. 573,690

4 Claims. (Cl. 214—10.5)

This invention relates to a novel form of supporting rack and cooperating transfer device for use in the manufacture of split piston rings.

In the course of manufacturing split piston rings, it is apparent that the handling of the rings in their transfer from one machine to another is a large part of the work involved in completing the various operations. It is, therefore, the principal object of my invention to provide supporting racks of novel form upon which the split rings are arranged to be slidably supported by their gap portions at the conclusion of each of a number of the operations, the racks being designed in relation to a novel form of elongated transfer pliers or tongs so that a large number of rings can be quickly and easily picked up off a given rack and transferred to another machine for the next operation.

To speed up production, it is important that the piston rings be transferable in groups, of say sixteen rings at a time, and that these groups be segregated for convenient pick up without the necessity for the operator counting or measuring off so many rings to a group.

It is, therefore, another object of my invention to provide a slide rack either on the split and trim machine, or as an adjunct to the rack on that machine, having a step formation on the discharge end thereof, each step of which corresponds in length to the length of one of the stacks on the arbor, whereby to facilitate the transfer of the correct number of rings to the arbor for each of the say three stacks and accordingly cut the time on this operation to a minimum, making it possible for a single operator easily to prepare a new set-up for the rough turning operation while the turning operations are under way on two lathes, one doing the rough turning and the other the finish turning. The releasing operations and reclamping operations between the rough turning and finish turning operations can, of course, be taken care of as soon as an arbor with rough turned rings is removed from the first lathe and another arbor inserted containing rings to be rough turned. The time element involved is such that there are no bottle necks in the continuous flow of rings from start to finish of the process.

The invention is illustrated in the accompanying drawings, in which:

Fig. 1 is a fragmentary front view of a split and trim machine, illustrating the first slide rack on the discharge end thereof;

Fig. 2 is an enlarged view of the discharge end of the first rack or an adjunct thereto, showing the step feature for facilitating the separation of rings into the stacks used on the arbors;

Fig. 3 is an end view of the rack shown in Fig. 2;

Fig. 4 is a view of one of the arbors set up with three stacks of rings thereon ready for the rough turning operation on the first lathe;

Figs. 5 and 6 are fragmentary plan views of the two lathes, each equipped with a plurality of cutting tools for the speedier turning of the rings in the rough turning and finish turning operations;

Fig. 7 is a perspective view of a storage rack onto which the finish turned rings are placed preparatory to their transfer to the rough and finish boring machine, the view including a perspective showing of a stack of rings on this rack on transfer tongs or pliers, about to be removed from said rack preparatory to the placing of this stack of finish turned rings into the rough and finish boring machine;

Fig. 8 is a perspective view of the rough and finish boring machine, showing the discharge racks on the lower front portion thereof on the first of which the rough bored rings are assembled preparatory to their transfer to the other side of the machine for the finish boring operation, the other rack catching the rings after the finish boring operation and assembling them preparatory to their transfer to the finish trim machine;

Fig. 9 is a fragmentary front view of the finish trim machine, showing on the discharge end thereof the final slide rack on which the finished rings are caught;

Fig. 10 is a side view of a pair of transfer tongs or pliers made in accordance with my invention, like those shown in Figs. 7 and 8;

Fig. 11 is a larger end view of the transfer tongs illustrated in cooperating relationship to one of the slide racks;

Fig. 12 is a perspective view illustrating how the operator can easily handle a stack of rings with the improved tongs and place the stack in a nearly vertical position in the boring machine, as is also shown on a smaller scale in Fig. 13, and Fig. 13 is a larger perspective view of the boring machine illustrated in Fig. 8.

The same or similar reference numerals are applied to corresponding parts throughout the views.

In connection with Figs. 1 to 9, the dotted arrows, designated A to I, serve to indicate the transfers of the rings from one machine operation to another, commencing with the splitting and trimming operation in Fig. 1 and ending with the finish trimming operation in Fig. 9.

The piston ring splitting and trimming machine shown in Fig. 1 forms the subject matter of a co-pending application Serial No. 570,999, filed January 1, 1945, now U. S. Patent No. 2,560,549, issued July 17, 1951, and comprises a supporting V-bed 15 in which a stack 16 of rings to be split and trimmed is slidable horizontally for movement at a feed rate in the direction of the arrow relative to a pair of laterally spaced gap cutters 17 which cut out a slug of prescribed length from the elliptical ring blanks, so as to leave the rings in the form of an open resilient spring compressible to circular form. The split rings move at a feed rate through the tapered bore 18 of the sizing ring 19, so as to be gradually compressed radially until they reach the short end portion 20 of the bore that is of a uniform predetermined diameter. The diameter of the portion 20 is only a few thousandths of an inch larger than the predetermined outside diameter of the rings in relation to which the gaps are to be milled to a predetermined width by the milling cutter 21. This gap milling cutter 21 is of a thickness to insure milling the gaps in the rings to said predetermined width, this milling operation occurring as the split rings are emerging from the bore 20, so that the rings immediately thereafter are free to drop out of the machine onto a discharge slide rack 22. This rack is of I-beam cross-section, whereby to slidably support the rings by their gaps on the web portion 23 of the rack between the longitudinally extending flanges 24 thereof. The rings, as they enter the tapered portion 18 of the sizing ring 19, are guided by their gaps by a longitudinally extending blade 19' entered in the gaps, so that the gap portions of the rings are properly presented to the milling cutter 21 for the initial trimming operation in the gaps. The rings, incidentally, are also thereby guided properly onto the rack 22 on which they are guided by their gap portions, as previously stated. From this point on, as will later appear, advantage is taken of the gaps at every step of the process of manufacture both to facilitate the handling of the rings in their transfer from one machine to another and to guide the rings slidably, whether it be on racks, or in the passage of the rings through the boring machine, or the finish trimming machine.

A V-shaped rack 25 is shown in Figs. 2 and 3 having a vertical middle rib 26 which enters the gaps of the rings R to guide the rings in their sliding movement along the rack, during which the rings have their gap end portions freely slidable along the top edges 27 of the V, as clearly shown in Figs. 2 and 3. The rack 25 may be a separate rack or an extension of the rack 22. The arrows A may, therefore, be considered as indicating either the sliding of the rings along rack 22 directly onto rack 25, or the transfer of these rings in any suitable manner from rack 22 to rack 25. Where the rack 25 is an extension of rack 22, the lower flange 24 of the rack 22 has the top surface thereof level with or slightly above the top edges 27, as indicated by the dotted lines 24' in Fig. 1, and the web 23 of the rack 22 is in coplanar relation to and coextensive with the vertical rib 26 of the rack 25, as indicated in dotted lines at 23' in Fig. 1, the web 23' being either of the same thickness as the rib 26 or slightly greater, so that the rings R will slide freely from rack 22 onto rack 25. The rack 25 is of the same V form as other racks 28, 29 and 30, referred to later and shown in Figs. 7 and 8.

Coextensive with the discharge end of the rack 25, which it will, of course, be understood will be of any suitable length, as for example, like either of the racks 28 in Fig. 7, is a vertical gauge plate 31 which, as indicated in Fig. 3, is in coplanar relation with and of the same thickness as the vertical rib 26 of the rack 25 and is secured to said rib by strips 32. On the opposite sides of the gauge plate 31 are mounted stepped gauges 33 providing three steps 34, 35 and 36 at different levels below the level of the top edges 27 of the V-rack 25, and these three steps are of the same predetermined length so as to permit quickly counting out three groups of rings, sixteen or so in a group, to mount on the arbor 37. The transfer of the rings in groups from the gauges 33 to the mandrel 37 is indicated by the dotted arrows B. Obviously, a considerable saving in time is realized by the use of the gauges 33, as compared with the operator having to measure each group or count out so many rings to a group.

The transfer of arbor 37 to a lathe 43 for the rough turning operation is indicated by the dotted arrows C, and the subsequent transfer of the work from the lathe 43 to another lathe 44 for the finish turning operation is indicated by the dotted arrows D. Three cutting tools are used in each turning operation, as indicated at 45 in Fig. 5 and at 49 in Fig. 6, to save time and accordingly reduce cost.

After the finish turning operation, the rings are released from the arbor and placed on the racks 28 (Fig. 7), this transfer being indicated by the dotted arrows E. There are two racks supported by means of yokes 51 on opposite sides of standards 52, the yokes being suitably secured to the upper edge portions of the vertical rib portions 26 of said racks. The operator, having handled the rings in groups of say sixteen in transferring them from the gauges 33 on the end of the rack 25 to the arbors 37, with the gaps all more or less aligned, will have no difficulty in slipping the groups of rings onto the one end of the racks 28 with the vertical rib portions 26 entered in the gaps. Two racks 29 are usually provided at this point in the manufacture of the rings, because of the fact that so many rings are disposed of by the lathe 44 at a time, and unless the boring machine, shown at 53, is being operated continuously to do the rough and finish boring operation on the rings as fast as they come from the finish turning operation on the lathe 44, a single rack of a reasonably short length might not afford sufficient storage capacity. The lathe operator slides the rings R forward on the racks 28 as he requires room at his end for other rings which have just been finish turned, this forward movement being indicated by the dotted arrows F. The boring machine operator at the other end of the racks 28 uses a pair of tongs or pliers of elongated form, indicated at 54 in Fig. 7, for transferring the rings R in stacks of anywhere from forty-five to eighty rings in a group from the racks 28 to the boring machine 53, as indicated by the dotted arrows G, the number of rings handled in a single group in this way depending, of course, upon the length of the jaws 55 on these tongs and the thickness of the rings being handled. The tongs 54 are shown in Figs. 10 to 12 and comprise elongated handles 56 mounted on one end of V-shaped frame members 57 on the other end of which the jaws 55 are mounted, the V- shaped frame members 57 being pivotally interconnected by their crotch portions by a through pin 58. The jaws 55 have L-shaped blades 59 of reduced thickness mounted on the lower edge portions thereof back to back. These blades 59 are of such thinness, and the vertical rib portions 26 of the racks 28 are also of such thinness, that the blades 59 may easily be slipped into place in the gaps of a series of rings R supported on the racks, as shown in Fig. 11. Because of the free spaces under the end portions of the rings between the vertical rib portion 26 and the divergingly extending arm portions of the rack 28, the toe portions 59a of the blades can easily be seated under the end portions of the rings on their inner circumference, whereupon the operator need only take hold of the handles 56 in one hand, as illustrated in Fig. 12, and move the handles 56 closer together to pick up the series of rings off the rack as a unit, because the closing of the handles 56 results in a spreading of the jaws 55 and the blades 59, which are more or less flexible, being of spring metal, will grip the rings resiliently by their gap portions. The rings are held securely enough so that a series of them can be carried with one hand with reasonable safety so long as the handles 56 are kept horizontal, or nearly so. Of course, when the stack of rings being handled in this way is to be placed in a nearly vertical position in the boring machine, the operator should take the precaution to place his other hand under the stack, in the manner illustrated in Fig. 12, to avoid likelihood of the rings slipping off the lower end of the blades 59. These same tongs 54, as will soon appear, or tongs of the same construction, can be used in the transfer of rings R from the rack 29 after the rough boring operation to the other side of the boring machine 53 for the finish turning operation, as indicated by the dotted arrows H, and later in the transfer of the rings from the rack 30 after the finish boring operation to the finish trimming machine 60 (Fig. 9), as indicated by the dotted arrows I. Obviously, the fact that the rings on these various racks are supported with their gaps aligned greatly facilitates the transferring thereof from one place to another, and the novel design of the tongs 54 which permits a large group of rings to be picked up and transported handily, as described, also greatly facilitates matters and speeds up production.

The boring machine 53, shown in Figs. 8 and 13, forms the subject matter of a co-pending application Serial No. 570,998, filed January 1, 1945, now U. S. Patent No. 2,437,676 issued March 16, 1948. After boring, the rings slide forwardly along the racks 29 and 30 and are removed by the operator from the rack 29 after the rough boring operation has been performed in the right-hand half of the machine 53 and replaced in the left-hand half for the finish boring operation, as indicated by the dotted arrows H in Fig. 8. The subsequent transfer from the rack 30 to the finish trimming machine 60 after the finish boring operation is indicated by the dotted arrows I in Fig. 8.

After trimming, the rings drop out of the sizing ring 19a onto the chute 22a that is of I-beam section like the chute 22 of Fig. 1, and this chute may guide the rings to any suitable discharge point for final inspection and then packaging.

While I have disclosed my invention as used in the making of piston rings, I want to point out that this is only one of a number of uses to which it may be put. The invention is also usable to advantage, for example, where rings are dipped in a rust-proofing solution, or a cleaning solution, preliminary to the coating of the rings with oil to prevent rusting, in which cases the transfer pliers may be used to advantage in the dipping of the rings as they are removed in groups with the pliers from racks, and in some cases arrangement may be made for the sliding of rings on racks of the novel form herein disclosed for movement through a bath or baths for the treatment or cleaning and oiling. These racks are also usable to advantage in the inspection of rings, the rings being either slid along on the rack for inspection one by one as they are slid along, or as they are removed from the end of the rack and prepared for packaging. Many other uses, it is expected, will be made of the novel racks and pliers herein disclosed. These uses are, of course, not limited to piston rings.

It is believed the foregoing description conveys a good understanding of all of the objects and advantages of my invention. The appended claims have been drawn with a view to covering all legitimate modifications and adaptations.

I claim:

1. In the handling of split piston rings and the like; an elongated substantially horizontal combined slide and support bar for a stack of the rings arranged face to face, said slide bar including a pair of arm portions adapted to engage the rings on their inner circumference and a vertical portion intermediate said arm portions projecting upwardly through the gaps between the end portions of the rings to guide the rings in their sliding movement and maintain the gaps in alignment, the engagement between said arm portions and the rings occurring at points spaced laterally from said vertical guide portion and establishing a free space therebetween under the end portions of the rings and similar spaces between the opposite faces of said vertical guide portion and the end faces on said rings whereby a tongs device may cooperate with said support bar for removing from said bar or depositing thereon a stack of rings simultaneously, the tongs device including a pair of relatively movable elongated jaws of L-shaped transverse section arranged back-to-back which may be inserted in the spaces between said vertical guide portion and the end faces of the rings and the toe portions of the jaws seated beneath the end portions of the rings in the said free space thereunder.

2. A slide bar as defined in claim 1 and which further includes a gauge at one end of said bar for measuring off the rings into a plurality of end-to-end positioned and longitudinally offset stacks, said gauge comprising a vertical guide member arranged coplanar with and secured to the said vertical guide portion of said slide bar, and substantially horizontal sets of gauge bars of predetermined length arranged in succession at opposite sides of said guide member on the top of which the end portions of the rings are adapted to rest in the grouping of the rings into stacks, said sets of gauge bars being stepped vertically downward in the direction of ring travel along the slide bar and gauge bars for segregation of the rings into stacks of lengths equal to the lengths of said sets of gauge bars.

3. In the handling of split piston rings and the like, an elongated substantially horizontal slide bar for slidable suspension support of a plurality of rings by their end portions while disposed face to face, said slide bar having a vertical portion projecting upwardly between the end portions to guide the rings in their sliding movement and maintain the gaps aligned, the slide bar being V-shaped, the rings being suspended by their end portions slidably supported on the upper edges of the arms of the V at points spaced laterally from said vertical portion which acts as a guide maintaining the gaps of the rings in alignment, and the vertical guide portion projecting upwardly between the arms of the V.

4. In the handling of split piston rings and the like, an elongated substantially horizontal slide bar for slidable suspension support of a plurality of rings by their end portions while disposed face to face, said slide bar having a vertical portion projecting upwardly between the end portions to guide the rings in their sliding movement and maintain the gaps aligned, the slide bar being V-shaped, the rings being suspended by their end portions slidably supported on the arms of the V at points spaced laterally from said vertical portion which acts as a guide maintaining the gaps of the rings in alignment, and the vertical guide portion projecting upwardly from the middle portion of the V.

ALBERT H. BATES.

REFERENCES CITED

The following references are of record in the file of this patent:

UNITED STATES PATENTS

| Number | Name | Date |
| --- | --- | --- |
| 662,494 | Morris | Nov. 27, 1900 |
| 737,568 | Bingham | Sept. 1, 1903 |
| 1,178,404 | Lloyd | Apr. 4, 1916 |
| 1,317,500 | Holmquist | Sept. 30, 1919 |
| 1,326,925 | Goldberg | Jan. 6, 1920 |
| 1,561,336 | McGlenn | Nov. 10, 1925 |
| 1,946,881 | Porter | Feb. 13, 1934 |
| 1,990,579 | Adams et al. | Feb. 12, 1935 |
| 2,027,116 | Oubridge | Jan. 7, 1936 |
| 2,137,737 | Wenzel | Nov. 22, 1938 |
| 2,151,868 | Porfido | Mar. 28, 1939 |
| 2,183,358 | Six | Dec. 12, 1939 |
| 2,410,819 | Haling | Nov. 12, 1946 |
| 2,466,740 | Reynolds | Apr. 12, 1949 |